(12) United States Patent
Sordelet et al.

(10) Patent No.: US 10,837,846 B2
(45) Date of Patent: Nov. 17, 2020

(54) METHOD FOR SENSOR INSTALLATION ON COMPONENT

(71) Applicant: Caterpillar Inc., Peoria, IL (US)

(72) Inventors: Daniel Joseph Sordelet, Peoria, IL (US); Arun Rajendran, Peoria, IL (US); John Allan White, West Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 260 days.

(21) Appl. No.: 15/836,264

(22) Filed: Dec. 8, 2017

(65) Prior Publication Data

US 2019/0178732 A1 Jun. 13, 2019

(51) Int. Cl.
*G01L 1/22* (2006.01)
*G01L 9/00* (2006.01)

(52) U.S. Cl.
CPC .......... *G01L 1/2287* (2013.01); *G01L 9/006* (2013.01)

(58) Field of Classification Search
CPC ....... G01L 1/2268; G01L 1/2287; G01L 1/26; G01L 9/006
See application file for complete search history.

(56) References Cited

U.S. PATENT DOCUMENTS

| | | | | |
|---|---|---|---|---|
| 3,118,301 A | * | 1/1964 | Bajenski et al. | G01L 1/2287 73/774 |
| 4,455,530 A | * | 6/1984 | Lee | G01N 27/048 324/446 |
| 5,000,037 A | * | 3/1991 | Baresh | G01B 7/14 33/552 |
| 8,475,134 B2 | | 7/2013 | Buleon et al. | |
| 2010/0000337 A1 | | 1/2010 | Wiedemann | |
| 2017/0167930 A1 | | 6/2017 | Salm et al. | |
| 2018/0038779 A1 | * | 2/2018 | Dehghan Niri | G01N 3/08 |
| 2019/0178732 A1 | * | 6/2019 | Sordelet | G01L 1/2268 |

FOREIGN PATENT DOCUMENTS

DE   102013007644   11/2014

* cited by examiner

*Primary Examiner* — Minh N Trinh
(74) *Attorney, Agent, or Firm* — Oblon, McClelland, Maier & Neustadt

(57) ABSTRACT

A method for installing a sensor on a component is provided. The method includes attaching the sensor to a surface of the component. The method includes covering the sensor using a metal wire. The method includes applying a multilayer coating on the metal wire. Applying the multilayer coating includes applying a first coating. The first coating is capable of being machined. Applying the multilayer coating includes machining the first coating and applying a second coating over the first coating. The second coating is a ceramic oxide and the second coating is configured to serve as a thermal and dielectric barrier. Applying the multilayer coating also includes applying a third coating over the second coating. The third coating is configured to provide erosion resistance.

10 Claims, 4 Drawing Sheets

METHOD FOR SENSOR INSTALLATION ON COMPONENT

TECHNICAL FIELD

The present disclosure relates to a system and a method for installation of a sensor, and more specifically, to installation of a strain gauge on a cylinder liner.

BACKGROUND

Sensors, such as strain gauges, are often attached to components in engines and other moving or highly stressed locations within machines. It may be needed to protect these sensors from an operating environment in which the sensors are installed. For example, strain gauges attached to an outer diameter of cast iron cylinder liners need to withstand high temperatures from combustion and erosion from turbulent coolants.

U.S. Pat. No. 8,475,134 describes a method including depositing, by alumina spraying, an electrically insulating sub layer on the substrate, then in placing the sensor on the electrically insulating sub layer and finally in depositing, by alumina spraying, a cover layer on the sensor and the electrically insulating sub layer. The method further includes, before the cover layer is deposited, a step in which an impermeable and thermally insulating cement is applied locally on wires of the sensor.

SUMMARY OF THE DISCLOSURE

In one aspect of the present disclosure, a method for installing a sensor on a component is provided. The method includes attaching the sensor to a surface of the component. The method includes covering the sensor using a metal wire. The method includes applying a multilayer coating on the metal wire. Applying the multilayer coating includes applying a first coating. The first coating is capable of being machined. Applying the multilayer coating includes machining the tfirst coating and applying a second coating over the first coating. The second coating is a ceramic oxide and the second coating is configured to serve as a thermal and dielectric barrier. Applying the multilayer coating also includes applying a third coating over the second coating. The third coating is configured to provide erosion resistance.

In another aspect of the present disclosure, a component having a sensor installed thereon is provided. The sensor is installed using process steps of attaching the sensor to a surface of the component, covering the sensor using a metal wire, and applying a multilayer coating on the metal wire. Applying the multilayer coating includes applying a first coating. The first coating is capable of being machined. Applying the multilayer coating includes machining the first coating and applying a second coating over the first coating. The second coating is a ceramic oxide and is configured to serve as a thermal and dielectric barrier. Applying the multilayer coating also includes applying a third coating over the second coating. The third coating is configured to provide erosion resistance.

In yet another aspect of the present disclosure, a strain gauge installed on a cylinder liner of an engine is provided. The strain gauge is installed using process steps of attaching the strain gauge to a surface of the cylinder liner, covering the strain gauge using a metal wire, and applying a multilayer coating on the metal wire. Applying the multilayer coating includes applying a first coating. The first coating is capable of being machined. Applying the multilayer coating includes machining the first coating and applying a second coating over the first coating. The second coating is a ceramic oxide and is configured to serve as a thermal and dielectric barrier. Applying the multilayer coating also includes applying a third coating over the second coating. The third coating is configured to provide erosion resistance.

Other features and aspects of this disclosure will be apparent from the following description and the accompanying drawings.

DETAILED DESCRIPTION

Figure 1:
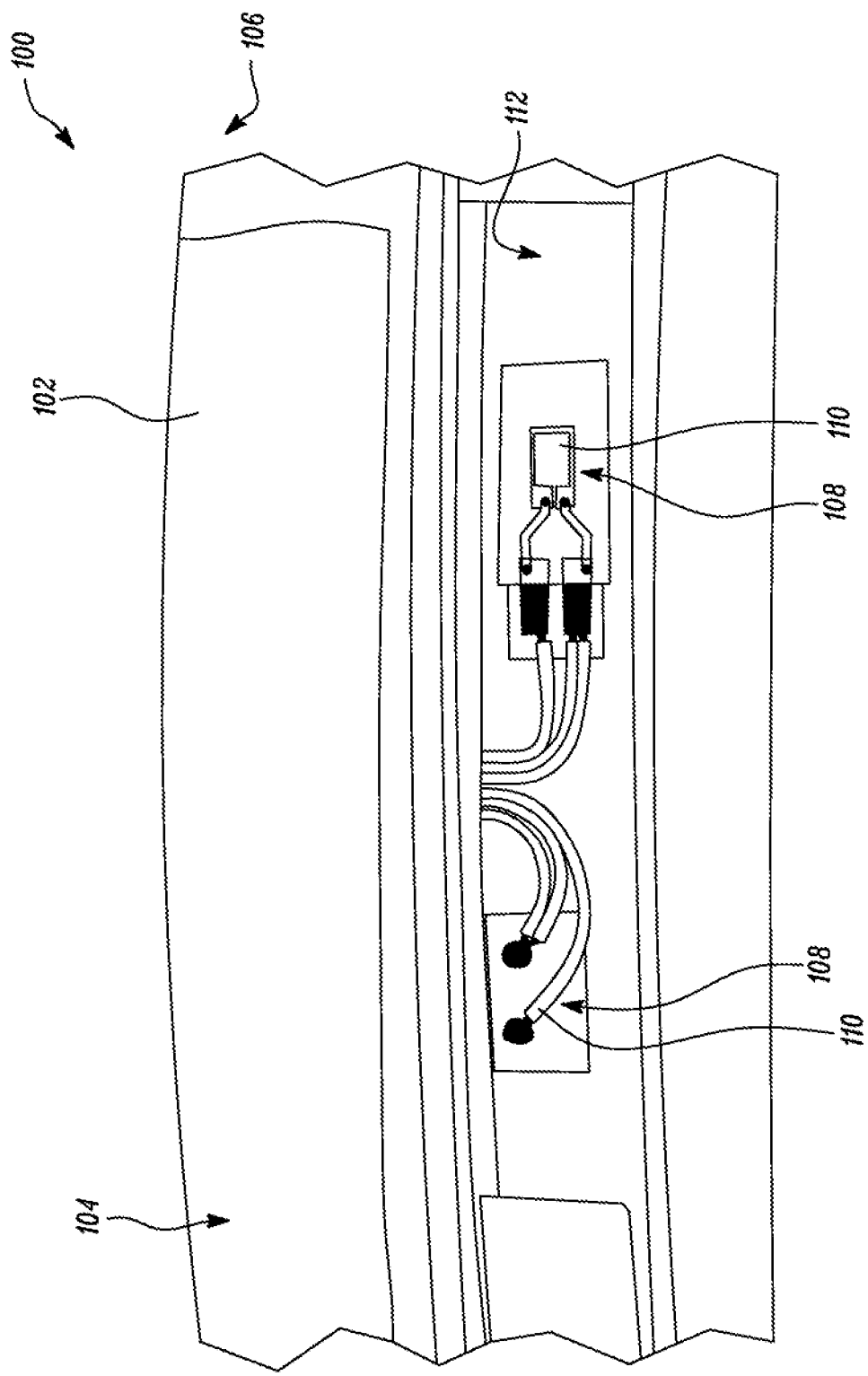
FIG. 1 is a front view of an exemplary component, in accordance with the concepts of the present disclosure.

Referring to FIG. 1, an exemplary component 100 is illustrated. The component 100 is a cylinder liner 102. An internal combustion engine includes a cylinder block having a cylinder bore in which the cylinder liner 102 is disposed. More particularly, the cylinder bore includes a shoulder against which the cylinder liner 102 seats.

The cylinder block includes one or more appropriately configured channels through which liquid coolant is transported. One or more branch channels of the channels allow a flow of liquid coolant along the cylinder liner 102, and between the respective channels in the cylinder block and cylinder head. A piston is reciprocally disposed within the cylinder liner 102, and is pivotally connected with a connecting rod via a piston pin.

The cylinder liner 102 has a surface 104 and a first end 106 which is disposed adjacent to the cylinder head. The cylinder liner 102 includes a shoulder which abuts against the corresponding shoulder of the cylinder block 12. The shoulder is disposed at a predetermined axial distance away from the first end 106 of the cylinder liner 102. The cylinder liner 102 may also include one or more annular grooves with corresponding annular seals therein which seal between the cylinder liner 102 and the cylinder block. The cylinder liner 102 defines an inside diameter which is sized slightly larger than an outer diameter of the piston.

The present disclosure relates to a sensor 108 installed on the surface 104 of the component 100. In one embodiment, the sensor 108 includes a strain gauge 110 installed on the cylinder liner 102. A number of strain gauges 110 may be provided on the surface 104 of the cylinder liner 102 within an annular groove 112 provided thereon. For example, eight strain gauges 110 may be placed at different locations along an outer circumference of the cylinder liner 102.

Referring to FIG. 1, two strain gauges 110 are shown for measuring axial and hoop directional strains. In the illustrated embodiment, the hoop strain gauge 110 measures the liner expansion due to cylinder pressure built during combustion. The axial strain gauge 110 measures the local deflection of the cylinder liner 102 due to piston motion and cylinder pressure. The two strain gauges 110 are used to measure a biaxial stress state for a particular orientation of the cylinder liner 102. Alternatively, the number and position of the strain gauges 110 may vary. In order to preserve and protect the strain gauges 110 from heat and erosion, the present disclosure provides a multilayer coating 304 (see FIG. 3) on metal wires 202 (see FIG. 2) provided on top of the surface 104 of the cylinder liner 102 to which the strain gauges 110 are attached.

Initially, the strain gauges 110 are bonded to the surface 104 of the cylinder liner 102. In one embodiment, any suitable adhesive, such as VISHAY MBOND 610 GLUE, may be used to affix the strain gauge 110 to the surface 104. The adhesive is then baked to cure at a temperature of approximately 375 F for a fixed duration of time. Alternatively, the strain gauge 110 may be tack welded to the surface 104 of the cylinder liner 102.

Further, measurement signal wires are soldered to tabs of the strain gauge 110 after baking the adhesive. It should be noted that the solder beads need to be kept as small and/or flat as possible (approximately within 0.8 mm), since there is minimal height clearance inside the groove 112 of the cylinder liner 102 in which the strain gauge 110 is installed. The measurement signal wires associated with the strain gauge 110 are laid flat and untwisted and are glued to the surface 104 of the cylinder liner 102. Thereafter, the groove 112, the measurement wires, and the strain gauge 110 are cleaned and prepared for applying an insulating layer 302 (see FIG. 3), for example, RTV or high temperature silicone adhesive.

This insulating layer 302 is selectively applied as thin as possible only on top of the strain gauge 110 and the associated solder beads and is applied very smoothly and evenly. After the insulating layer 302 is fully dried, any excess residue is removed to avoid any exposure of the insulating layer 302 during application of the multilayer coating 304 which will be discussed later in this section. The multilayer coating 304 is sprayed onto metal surfaces only and does not contact the insulating layer 302.

Figure 2:
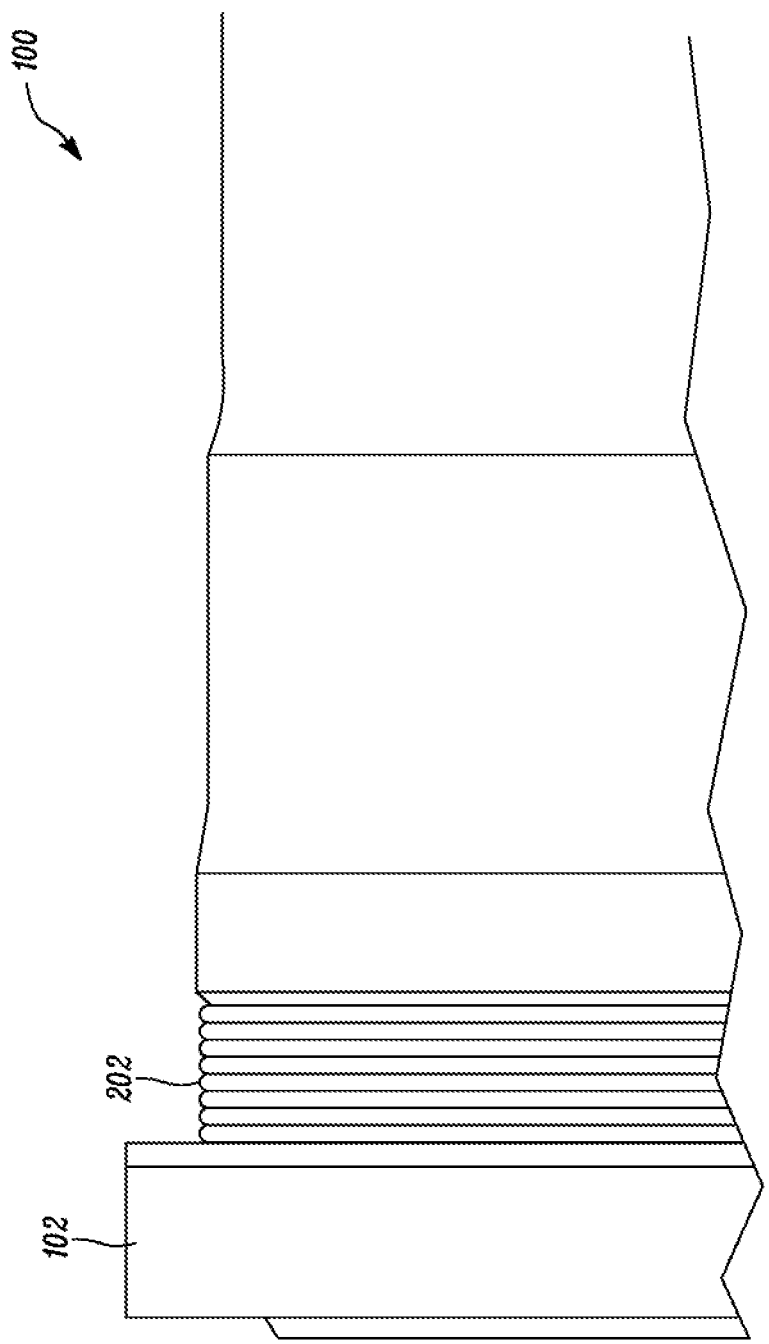
FIG. 2 is a side view of the exemplary component of FIG. 1, in accordance with the concepts of the present disclosure.

Referring to FIG. 2, the metal wires 202 are wrapped around the outer circumference of the cylinder liner 102 and are used to cover the strain gauge 110. The metal wires 202 are wound and spot welded to the surface 104 of the cylinder liner 102 at ends of the metal wires 202 to keep the metal wires 202 taut and in place. The metal wires 202 also squeeze down the insulating layer 302 applied, increasing sealing ability against any coolant intrusion that may occur during operation.

In one example, the metal wires 202 may extend along a thickness of the groove 112 and are provided annularly on the cylinder liner 102. The metal wires 202 can be made of any suitable material, for example, tungsten. The metal wires 202 are wrapped such that the strain gauge 110 and the surface 104 of the groove 112 of the cylinder liner 102 are completely covered by the metal wires 202. The metal wires 202 thermally protects the strain gauges 110. In one example in which multiple strain gauges 110 are bonded on an outer circumference of the cylinder liner 102 and the metal wires 202 are wrapped around the outer circumference of the cylinder liner 102 covering all the strain gauges 110.

Figure 3:
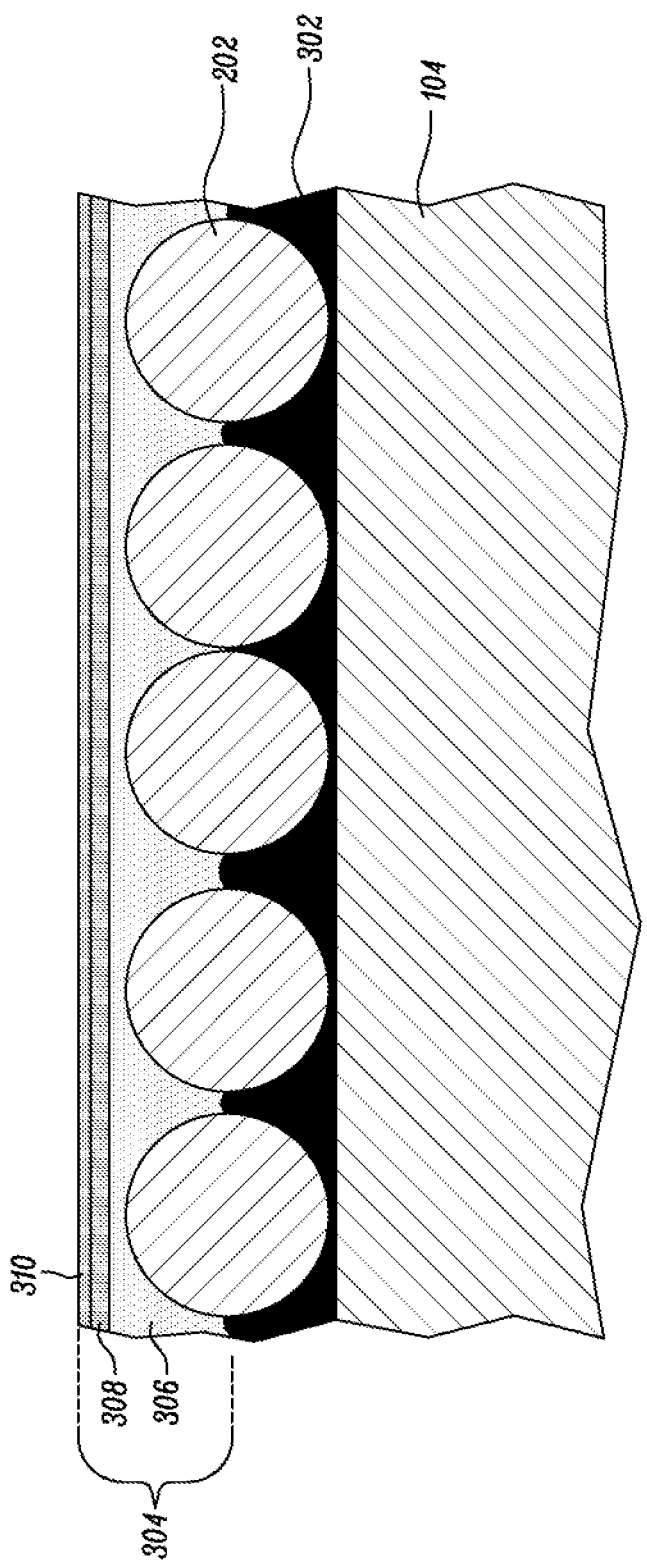
FIG. 3 is an enlarged schematic of a cross-section of a surface of the exemplary component having a multilayer coating applied thereon, in accordance with the concepts of the present disclosure.

Thereafter, the multilayer coating 304 is provided on the metal wires 202 using thermal spray coating method such as HVOF. It should be noted that the multilayer coating 304 does not reach the surface 104 of the cylinder liner 102. Referring to FIG. 3, the metal wires 202 have a circular cross-section for improving a filling ability such that the insulating layer 302 fills into gaps between the consecutive wires, preventing the multilayer coating 304 from reaching or contacting the surface 104 of the cylinder liner 102.

The insulating layer 302 protects and avoids the metal wires 202 from shorting or grounding the strain gauge 110, especially when the HVOF spray jet is applied mechanically by pushing the metal wires 202 closer to the strain gauge 110 and the associated solder beads where the measurement signal wires are attached. The insulating layer 302 also acts as a last layer of electrical insulation against engine coolant should the coating process fail and/or crack during prolonged engine firing conditions.

The multilayer coating 304 includes three layers. The multilayer coating 304 is configured to protect and preserve the strain gauge 110 from heat and erosion. The multilayer coating 304 is applied using thermal spray coating method. A person of ordinary skill in the art will appreciate that FIG. 3 is an enlarged exemplary cross-sectional schematic of the multilayer coating 304 applied on the metal wires 202. The appearance of the multilayer coating 304 in FIG. 3 is exemplary and representative, and is not an actual depiction of the multilayer coating 304.

Initially, a first coating 306 is applied on the metal wires 202. The first coating 306 is capable of being machined. The first coating 306 is of elemental aluminum. In one example, the first coating 306 may have a thickness in an approximate range between 0.5 mm and 2 mm. Further, the first coating 306 is machined using known methods. More particularly, in this case, the layer of elemental aluminum is sprayed onto the tungsten metal wires 202 using twin-wire arc spraying and then machined to yield a consistent diameter around the outer diameter of the cylinder liner 102, defining and limiting the thickness of the first coating 306.

Thereafter, a second coating 308 is applied over the first coating 306. The second coating 308 serves as a thermal and dielectric barrier. The second coating 308 includes using, for example, plasma-arc spraying to deposit a relatively thin layer of ceramic oxide, for example, aluminum oxide. In one example, the second coating 308 may have a thickness in an approximate range between 0.1 mm and 1 mm. Further, a third coating 310 is applied over the second coating 308. The third coating 310 is a hard layer for erosion resistance. The third coating 310 may include chromium carbide/nickel chromium ($Cr_2C_3$—NiCr). In one example, high-velocity oxygen-fuel (HVOF) spraying of chromium carbide/nickel chromium coating onto the ceramic oxide helps resist erosion of the third coating 310. In some embodiments, the third coating 310 may have a thickness in an approximate range between 0.1 mm and 1 mm.

It should be noted that strain gauge 110 provided on the cylinder liner 102 is an exemplary application of the multilayer coating 304. The multilayer coating 304 may alternatively be used for protection of other sensors 108 that are utilized on various components without deviating from the scope of the present disclosure.

INDUSTRIAL APPLICABILITY

Figure 4:
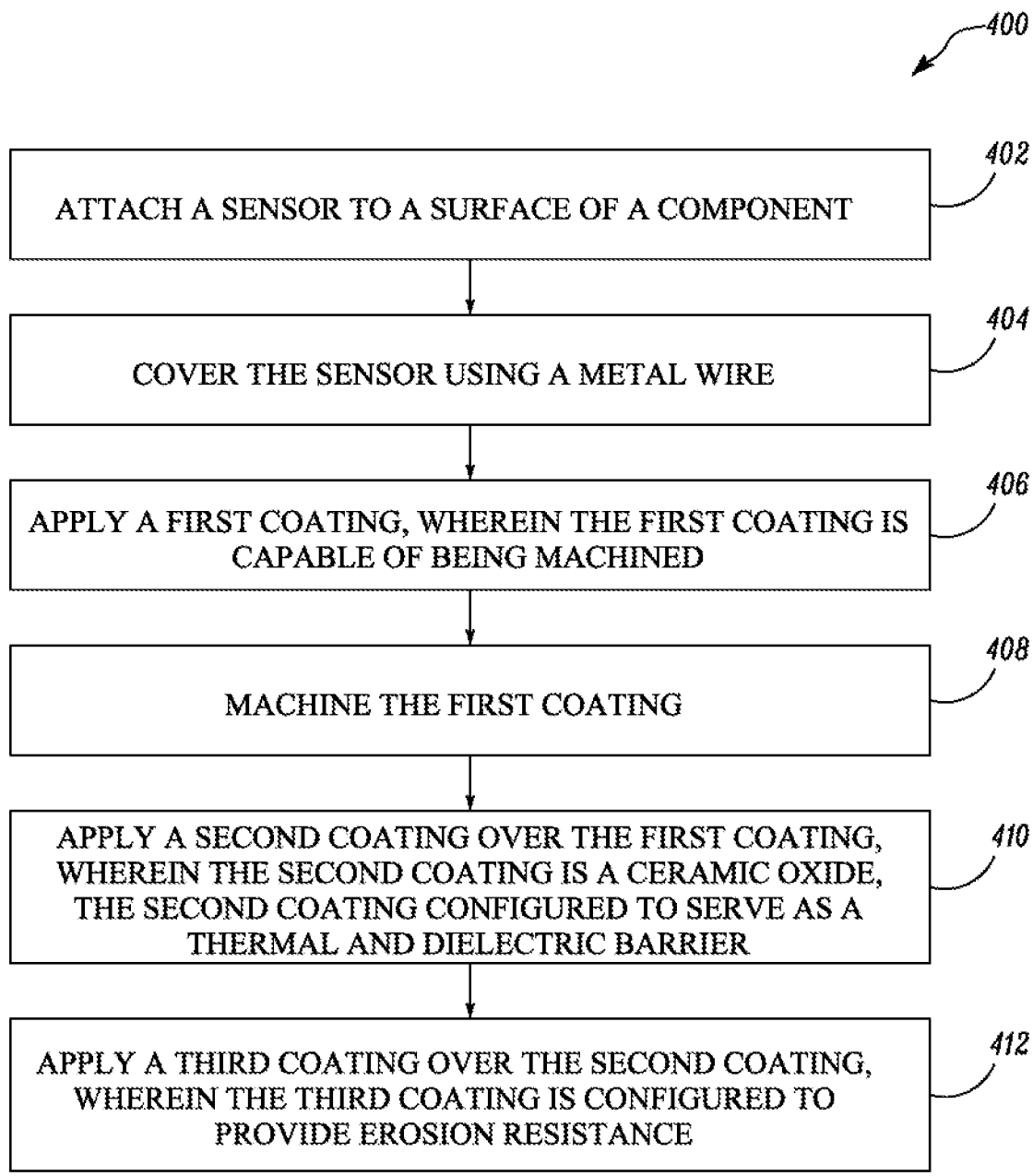
FIG. 4 is a flowchart of a method for installing a sensor on the component, in accordance with the concepts of the present disclosure.

The present disclosure provides the system and method 400 for installing the sensor 108 on the component 100. Referring to FIG. 4, at step 402, the sensor 108 is attached to the surface 104 of the component 100. At step 404, the sensor 108 is covered using the metal wires 202. Further, the multilayer coating 304 is applied on the metal wires 202. At step 406, applying the multilayer coating 304 includes applying the first coating 306. The first coating 306 is capable of being machined. Further, at step 408, the first coating 306 is machined. At step 410, the second coating 308 is applied over the first coating 306. The second coating 308 is a ceramic oxide and is configured to serve as a thermal and dielectric barrier. At step 412, the third coating 310 is applied over the second coating 308. The third coating 310 is configured to provide erosion resistance.

The present disclosure provides an effective method of coating sensor 108 installed on a variety of components. The method 400 provides a complex overlay architecture for protecting the sensor 108 from heat and erosion.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for installing a sensor on a component, the method comprising:
   providing the component, a metal wire, and the sensor;
   attaching the sensor to a surface of the component;
   covering the sensor by using the metal wire; and
   applying a multilayer coating on the metal wire, wherein said applying the multilayer coating includes:
     applying a first coating, wherein the first coating is configured for machining after the covering the sensor by the metal wire;
     machining the first coating;
     applying a second coating over the first coating, wherein the second coating is a ceramic oxide, the second coating configured to serve as a thermal and dielectric barrier; and
     applying a third coating over the second coating, wherein the third coating is configured to provide erosion resistance.

2. The method of claim 1, wherein said attaching the sensor to the surface of the component further includes applying an adhesive directly on the surface of the component.

3. The method of claim 1, wherein said attaching the sensor to the surface of the component further includes tack welding the sensor to the surface of the component.

4. The method of claim 1, wherein said covering the sensor by using the metal wire includes wrapping the metal wire around the sensor.

5. The method of claim 1, wherein the sensor is a strain gauge.

6. The method of claim 1, wherein the third coating includes chromium carbide/nickel chromium.

7. The method of claim 1, wherein the metal wire is made of tungsten.

8. The method of claim 1, wherein the metal wire has a circular cross section.

9. The method of claim 1, wherein the component is a cylinder liner.

10. The method of claim 9, further comprising attaching a plurality of strain gauges on an outer circumference of the cylinder liner, and wrapping the metal wire around the outer circumference of the cylinder liner so as to cover the plurality of strain gauges.

* * * * *